(12) United States Patent
Frisken (10) Patent No.: US 9,575,259 B2
(45) Date of Patent: Feb. 21, 2017

(54) N×N OPTICAL SWITCH (71) Applicant: Finisar Corporation, Horsham, PA (US)

(72) Inventor: Steven James Frisken, Vaucluse (AU)

(73) Assignee: Finisar Corporation, Horsham, PA (US)

( * ) Notice: Subject to any disclaimer, the term of this patent is extended or adjusted under 35 U.S.C. 154(b) by 130 days.

(21) Appl. No.: 14/320,531

(22) Filed: Jun. 30, 2014

(65) Prior Publication Data

US 2015/0331198 A1  Nov. 19, 2015

Related U.S. Application Data (60) Provisional application No. 61/842,006, filed on Jul. 2, 2013.

(51) Int. Cl.
*G02B 6/35* (2006.01)
*G02B 6/32* (2006.01)
(Continued)

(52) U.S. Cl.
CPC ............... *G02B 6/356* (2013.01); *G02B 6/32* (2013.01); *G02B 6/3512* (2013.01);
(Continued)

(58) Field of Classification Search
CPC ......... G02B 6/356; G02B 6/32; G02B 6/3518; G02B 6/3546
See application file for complete search history.

(56) References Cited

U.S. PATENT DOCUMENTS

| | | |
|---|---|---|
| 5,037,173 A | 8/1991 | Sampsell et al. |
| 5,440,654 A | 8/1995 | Lambert |

(Continued)

FOREIGN PATENT DOCUMENTS

WO  2013016758 A1  2/2013

OTHER PUBLICATIONS

Peter, et al., Optical Fiber Switching Device with Active Alignment SPIE, Mar./Apr. 1999, pp. 800-806, vol. 3680, retrived on May 1, 2016, http://proceedings.spiedigitallibrary.org/.
(Continued)

*Primary Examiner* — Daniel Petkovsek
(74) *Attorney, Agent, or Firm* — Kurt Rauschenbach; Rauschenbach Patent Law Group, LLC (57) ABSTRACT

An optical cross-connect connecting a series of optical input ports to a series of optical output ports includes at least a first group of input/output port arrays, each including a series of optical input/output ports disposed horizontally and configured to project or receive optical signals. A plurality of steering elements selectively steer optical signals along switching trajectories between the input and output ports. An angle-to-offset conversion unit converts optical signals propagating at the horizontal intra-array angles to corresponding spatial offset signals in the horizontal dimension. An optical interconnect includes a series of input/output regions, each being specific to a corresponding input/output port array and the input/output regions being divided vertically into elongated switching rows. Each input/output region receives spatial offset signals from the angle-to-offset conversion unit and optically interconnects each spatial offset signal from a first input/output region to a second input/output region.

14 Claims, 6 Drawing Sheets

(51) Int. Cl.
*G02B 6/34* (2006.01)
*G02B 26/08* (2006.01)

(52) U.S. Cl.
CPC .......... *G02B 6/3546* (2013.01); *G02B 6/3556* (2013.01); *G02B 6/34* (2013.01); *G02B 6/3518* (2013.01); *G02B 26/0833* (2013.01)

(56) References Cited

U.S. PATENT DOCUMENTS

| | | |
|---|---|---|
| 5,621,829 A | 4/1997 | Ford |
| 5,647,033 A | 7/1997 | Laughlin |
| 6,002,818 A | 12/1999 | Fatehi et al. |
| 6,097,859 A | 8/2000 | Solgaard et al. |
| 6,330,102 B1 * | 12/2001 | Daneman ............... B81B 3/0021 359/290 |
| 6,529,652 B1 * | 3/2003 | Brener ................ G02B 6/3586 385/16 |
| 6,704,476 B2 | 3/2004 | Ford et al. |
| 2002/0061158 A1 * | 5/2002 | Ducellier ............. G02B 6/3512 385/17 |
| 2008/0253715 A1 | 10/2008 | Dames |
| 2010/0172646 A1 | 7/2010 | Colbourne |
| 2012/0099176 A1 | 4/2012 | Zhou |

OTHER PUBLICATIONS

"Optical Circuit Switching Relieves Inter-Cluster Congestion in Datacenter Networks", Calient Technologies, 2012, 13 pages, www.calient.net, Goleta, California, US.

* cited by examiner

N×N OPTICAL SWITCH

CROSS-REFERENCE TO RELATED APPLICATION

This application is a non-provisional application of U.S. Provisional Patent Application Ser. No. 61/842,006 filed Jul. 2, 2013, entitled "N×N Optical Switch." The entire disclosure of U.S. Provisional Patent Application Ser. No. 61/842,006 is incorporated herein by reference.

FIELD OF THE INVENTION

The present invention relates to optical switches and in particular to an optical cross connect switch. While some embodiments will be described herein with particular reference to a cross connect switch in the context of datacenter applications, it will be appreciated that the invention is not limited to such a field of use, and is applicable in broader contexts such as optical networks outside datacenters.

BACKGROUND

Any discussion of the background art throughout the specification should in no way be considered as an admission that such art is widely known or forms part of common general knowledge in the field.

With the continued growth of information technology such as video-on-demand, mobile data and cloud computing, data traffic is increasing rapidly. This data is stored and routed through networks of datacenters located worldwide. Datacenters include banks of data servers interconnected by switches or cross-connects and routing cables, all contained within a secure, temperature controlled environment. Current datacenter and network architectures often experience difficulty in keeping up with this increase in data demand, leading to information bottlenecks.

Data routing using optical fibers is a primary transmission medium in datacenters due to its higher data rate capabilities, low loss, low power and reduced heat consumption. Switching between optical fibers within an optical network is typically performed by optical cross-connect switches (optical cross connects). However, conventional optical cross-connects used in external optical networks are generally not practical for use internally within datacenters due to their large size and high cost. The size of an optical cross-connect is generally limited by the fill factor of the arrays of switching mirrors and the collimating optics in the switch. Further, the size and cost of cross-connects generally scales up with increasing numbers of input and output fiber ports.

Other techniques are known for providing optical data routing, including using a matrix of mirror arrays in free-space propagation to direct optical beams. However, the optical beams have a large diameter to allow propagation, with a permissible level of loss, across free space. Another switching technique involves using Piezzo-electric beam steering devices. An example of this technique is disclosed in US Patent Application Publication 2008/0253715, entitled "Optical Switch" and assigned to Polaris Limited. These devices achieve low loss but do not have small form factors and hence are difficult to make compact. Waveguide and MEMs hinge mirrors, and "bubble" total internal reflection switches are also available but are yet to deliver practical results.

There is a need for an improved optical cross-connect that is compact in size and suitable for use in environments such as datacenters.

SUMMARY OF THE INVENTION

It is an object of the invention, in its preferred form to provide a compact, low cost optical cross-connect.

In accordance with a first aspect of the present invention, there is provided an optical switch including:
 a) a plurality of input optical ports spatially separated in at least a first dimension for projecting optical beams;
 b) a plurality of output optical ports spatially separated in at least the first dimension for receiving optical beams;
 c) a plurality of steering elements configured to selectively steer the optical beams along switching trajectories between the input and output optical ports at predetermined angles in the first dimension; and
 d) an angle-to-offset conversion unit positioned symmetrically between the input and output optical ports and configured to convert the predetermined angles into corresponding spatial offsets for directing the optical beams into selected optical ports.

Preferably, the switch includes an optical interconnect disposed between the steering elements for at least partially defining the switching trajectories.

The angle-to-offset conversion unit preferably includes a pair of cylindrical lenses having optical power in the first dimension and being disposed symmetrically about the optical interconnect.

The pair of cylindrical lenses preferably define a compound lens system. The compound lens system preferably has a focal length of f and the interconnect is disposed a distance of substantially f/2 from the steering elements. The steering elements preferably include micro-electromechanical mirrors (MEMs) configured to be electromechanically tiltable at a number of tilt angles for directing the optical beams along the switching trajectories.

The input and output optical ports are preferably arranged into a plurality of port arrays and the MEMS are tiltable in a second dimension at a number of tilt angles corresponding to the number of optical port arrays in the switch. The MEMs mirrors are preferably tiltable in the first dimension at a number of tilt angles corresponding to the number of optical ports in each port array. The tilt angle of the MEMs mirrors in the second dimension preferably directs optical beams to a selected optical port array from the plurality of port arrays and the tilt angle of the MEMs in the first dimension preferably selects the spatial offset to direct optical beams to a selected output optical port within the selected port array.

The switch preferably includes a second pair of cylindrical lenses having optical power in the second dimension for collimating the input optical beams through the optical interconnect in the second dimension. Each lens of the second pair of cylindrical lenses preferably has a focal length $f_2$ that is half the length of f ($f_2=f/2$).

The interconnect preferably includes a plurality of reflective elements for at least partially defining the switching trajectories. The interconnect preferably includes two opposable faces respectively defining first and second sides of the interconnect, the first and second sides extending perpendicularly from an optical axis of the switch.

The optical port arrays are preferably disposed with respect to the optical axis on either the first or second side of the interface. Preferably at least one of the optical port arrays is disposed off the optical axis. Preferably at least one of the optical port arrays is disposed at an angle to the optical axis. More preferably at least one of the optical port arrays is disposed perpendicularly to the optical axis.

The switch preferably includes at least one optical coupling device for directing optical beams along the optical axis from port arrays disposed off the optical axis. The at least one coupling device preferably includes a reflective mirror.

Neighboring ports in each port array are preferably physically offset with respect to each other in the second dimension.

In one embodiment, the switch includes four optical port arrays. In another embodiment, the switch includes six optical port arrays. Each optical port array preferably includes 20 optical ports.

The MEMs are preferably arranged into a corresponding plurality of MEMs arrays and each MEMs array is preferably associated with a corresponding port array, each MEMs array including a MEMs mirror for each optical port in the port array.

A first subset of the optical ports of each optical port array is preferably configured for inputting optical beams from optical fibers and a second subset of the optical ports of each optical port array is preferably configured for outputting optical beams to optical fibers.

In accordance with a second aspect of the present invention, there is provided an optical cross-connect connecting a series of optical inputs to a series of optical outputs, the cross-connect including:
  at least a first group of input/output units located substantially in a first horizontal plane;
  at least a second group of input/output units located substantially in a second horizontal plane spaced apart from the first horizontal plane;
  each of the input/output units having a series of optical input/output ports;
  an angle-to-offset conversion unit for converting a series of angular projected signals to corresponding parallel offset signals;
  a switching matrix unit having a series of input regions and a series of output regions, each of the regions being divided into elongated switching rows, with each elongated switching row receiving parallel offset signals from the angle-to-offset conversion unit and optically interconnecting the signal from a first switching row to a second switching row with predetermined interconnects interconnecting elongate switching rows across different horizontal planes.

In accordance with a third aspect of the present invention, there is provided a switching matrix unit including:
  at least a first and second elongated input regions, said input regions being spaced apart on substantially parallel planes; each of the input regions further being divided into a series of elongated switching rows, and
  an optical interconnect interconnecting the elongated switching rows with predetermined other elongated switching rows.

The optical interconnect preferably provides for a complete cross connect between optical signals input to the input regions.

The optical signals input are preferably substantially collimated, substantially parallel input beams. Optical signals entering a first switching row are preferably output at a second elongated switching row.

The switching matrix unit is preferably spatially reciprocal with optical signals entering the second elongated switching row being output at the first switching row.

The switching matrix unit preferably further includes a third elongated input region opposed to the first elongated input region, a fourth elongated input region opposed to the second input region, each of the input regions being divided into a series of elongate switching rows, with the switching rows being interconnected to one another.

The number of switching rows is preferably four and the number of elongated input regions is preferably two.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

BRIEF DESCRIPTION OF THE DRAWINGS

Preferred embodiments of the invention will now be described, by way of example only, with reference to the accompanying drawings in which.

DETAILED DESCRIPTION

Overview

Figure 1:
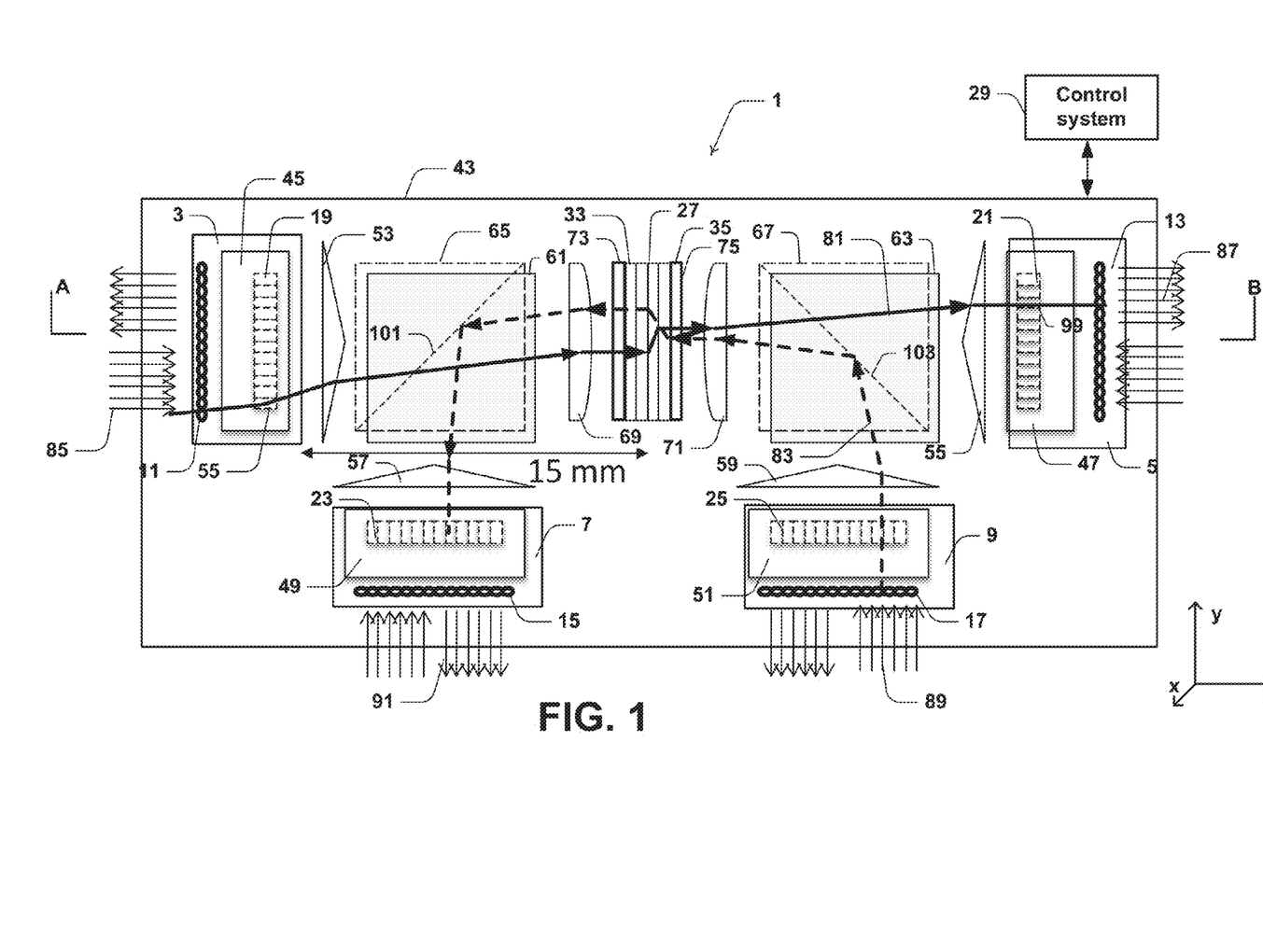
FIG. 1 illustrates a schematic plan view of an optical switch according to a first embodiment.

Referring to FIG. 1 there is provided a cross-connect type optical switch 1 for switching optical beams between eighty optical fibers. Switch 1 includes four input/output optical fiber banks 3, 5, 7 and 9 for enabling connection of optical fibers to switch 1. Each fiber bank includes an array of fiber connector ports 11, 13, 15 and 17 including a fiber v-groove array and micro-lenses for connection of up to twenty optical fibers (illustrated schematically as arrows) for projecting input optical beams and receiving output optical beams. In the illustrated embodiment, the fibers are separated into two groups of ten fibers, with one group being configured for inputting optical beams and the other group configured for outputting optical beams. For simplicity, only twelve fibers are shown—six input fibers and six output fibers. In other embodiments, different arrangements of input and output fibers are used including alternating input and output fibers.

Each fiber bank 3, 5, 7 and 9 also includes a corresponding array of steering elements in the form of micro-electro-mechanical mirrors (MEMs) arrays 19, 21, 23 and 25. The MEMs are positioned to receive optical beams input from the connected input optical fibers and to direct output optical beams back to connected output optical fibers. The fiber banks are configured to receive conventional ribbon fibers having a fiber spacing (pitch) of 250 μm. However, in other embodiments the fiber banks are configured to receive arrays of optical fibers having other pitches or to receive individual optical fibers. Each MEMs array includes twenty rectangular MEMs mirrors (again, for simplicity only twelve are shown), and each mirror is associated with a corresponding fiber in the associated fiber bank. In other embodiments, switch 1 includes more or less arrays of fibers and MEMs mirrors, and more or less optical fibers and MEMS mirrors per bank/array.

The mirrors of each MEMs array 11, 13, 15 and 17 are configured to be electromechanically tiltable at predefined tilt angles in two dimensions to route the optical beams between different optical fibers of different fiber banks or within the same fiber bank. In a first dimension (x-z plane in FIG. 1), the MEMs mirrors are tiltable at angles to direct beams to a predetermined fiber bank. This axis of switching (in the x-z plane) will be referred to as the 'array switching axis'. In a second dimension (y-z plane in FIG. 1), the MEMs mirrors are tiltable at angles to direct beams to a specific optical fiber within the predetermined fiber bank. This axis of switching (in the y-z plane) will be referred to as the 'intra-array switching axis'.

The particular trajectories between MEMs mirrors traversed by the optical beams are defined in part by an optical interconnect 27 that is disposed between the MEMs arrays. Interconnect 27 separately manipulates each directed optical beam along a predefined trajectory between first MEMs mirrors and second MEMs mirrors based on the particular MEMs mirror angles.

MEMs Arrays

Referring still to FIG. 1, the MEMs mirrors are tiltable at a number of predefined tilt angles in both the array switching axis and intra-array switching axis. The mechanical tilt control of the MEMs mirrors is provided by electrical control signals sent from a control system 29 along respective electrical control lines to each mirror. The specific angles are coded such that they direct beams to a predetermined fiber bank and then to a specific fiber within that predetermined fiber bank. In the array switching axis, the number of coded predefined switching angles is equal to the number of fiber banks in the switch, although the specific tilt angles for MEMs mirrors between different fiber banks may differ. In the case of switch 1 having four fiber banks 3, 5 7 and 9, the number of mirror tilt angles in the array switching axis is four. Tilting in the array switching axis directs the optical beams along predetermined trajectories to a specific fiber bank based on the tilt angle. That is, each MEMs mirror angle in the first dimension addresses beams from the associated optical fibers to one of the four fiber banks 3, 5 7 and 9, including direction back to the originating fiber bank. By way of example, tilting a MEMs mirror at angles of (3.5°, 1.5° may direct a beam to a fifth fiber in the array in fiber bank 5 while tilting that mirror at angles of (5.0°, 3.0° may direct a beam to an eighth fiber in the array in fiber bank 7.

In the intra-array axis the MEMs mirrors are tiltable at a number of predefined tilt angles corresponding to the number of optical fibers in each fiber bank. In the case of switch 1, the number of angles is twenty. Tilting in the second dimension directs the optical beams along predetermined trajectories to a predetermined optical fiber of the fiber bank that is selected by the mirror tilting in the first dimension. In this manner, beams from any one optical fiber are able to be addressed to any other optical fiber by appropriate tilting of the MEMs mirrors in two dimensions.

The MEMS mirrors in switch 1 are substantially rectangular and are disposed in an array such that their long sides are adjacent each other as with the keys of a piano. The rectangular shape allows close packing of the mirrors to provide an efficient high fill-factor design. It will be appreciated that switch 1 is operable with non-rectangular MEMs mirrors. However, in these latter embodiments, the alternate MEMs shapes inherently leads to lower fill factors and an overall larger scale switch.

In some embodiments, the adjacent fiber connections within a fiber bank are offset in the x-axis to provide additional port isolation to neighboring fibers. In these embodiments, the tilt of MEMs mirrors in the array switching axis takes into account this offset.

Interconnect

Figure 2:
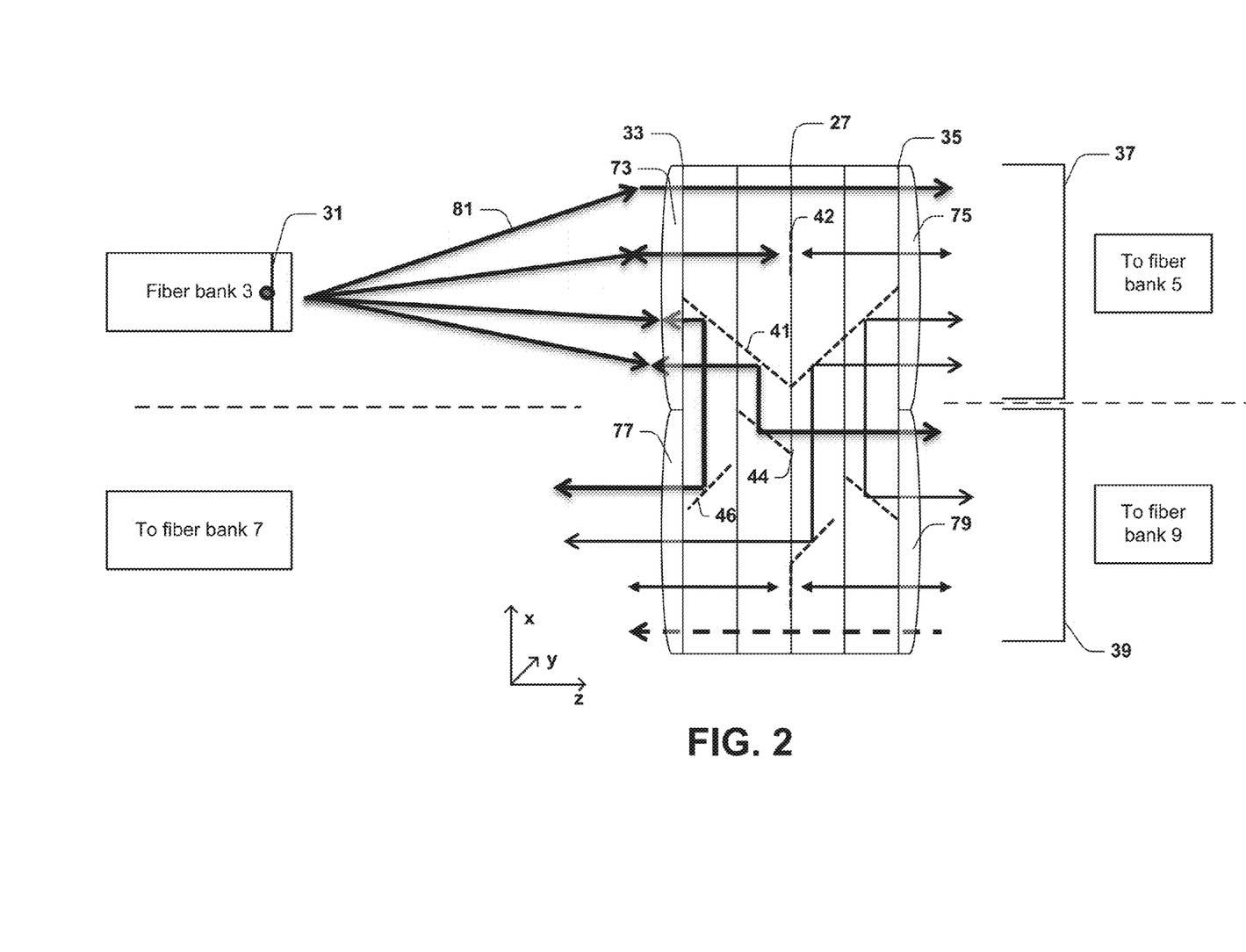
FIG. 2 illustrates a side view of an optical interconnect for use in the switch of FIG. 1 showing example beam trajectories arising from different mirror angles of a MEMs mirror.

Referring to FIG. 2, there is illustrated a simplified side view of interconnect 27 of FIG. 1 showing example beam trajectories arising from different mirror angles of a MEMs mirror 31. Interconnect 27 includes a first face 33 for receiving and transmitting beams to fiber banks 3 and 7, and a second face 35 for receiving and transmitting beams from fiber banks 5 and 9.

Across the faces 33 and 35 of interconnect 27, designated areas are allocated for beams originating from different fiber banks. To provide this spatial separation, interconnect 27 is divided into two vertical regions; upper region 37 and lower region 39, which are separated vertically in the x-dimension, as illustrated in FIG. 2. Further, fiber banks 3 and 5 are vertically offset with respect to fiber banks 7 and 9. This vertical offset can be observed in FIG. 3, which illustrates a horizontal cross-section of switch 1 taken along line A-B of FIG. 1.

Returning to FIG. 2, upper region 37 is responsible for coupling beams to and from upper fiber banks 3 and 5. Similarly, lower region 39 is responsible for coupling beams to and from lower fiber banks 7 and 9, which are displaced vertically on a lower plane from banks 3 and 5. Specifically, beams originating from bank 3 strike interconnect 27 at first face 33 of upper region 37. Similarly, beams exiting first face 33 of upper region 37 will be directed towards fiber bank 5. Beams originating and ending at bank 5 strike and emerge from face 35 of upper region 37. Beams originating and ending at bank 7 strike and emerge from face 33 of lower region 39. Finally, beams originating and ending at bank 9 strike and emerge from face 35 of lower region 39 of interconnect 27.

To define each trajectory, between faces 33 and 35, interconnect 27 includes reflective elements (e.g. 41, 42, 44 and 46), which reflect and direct optical beams along predefined paths through interconnect 27. As shown in FIG. 2, the particular trajectory traversed by an optical beam is dependent on the tilt angle of MEMs mirror 31. While not shown, tilting of mirror 31 in the intra-array switching axis (y-z dimension) also changes the trajectory of the beams through interconnect 27. Interconnect 27 is formed from four elongate vertically extending parallel switching rows 30, 32, 34 and 36. Reflective elements such as 41 are positioned within each of the four rows and are oriented at different angles to direct beams at 90° in other directions or 180° back on themselves. The rows are divided into vertically segregated parallel input regions through which the matrix of reflective elements define switching paths or trajectories for coupling beams between any two optical fibers in switch 1.

The thick lines in FIG. 2 illustrate example trajectories of optical beams from MEMs mirror 31 in fiber bank 3 to each fiber bank in switch 1 based on the four predefined tilt angles in the first dimension.

It will be appreciated that other configurations of reflective elements are possible to define different trajectories through interconnect 27. In particular, it will be appreciated that the reflective elements are able to direct beams in any of the x, y or z dimensions through interconnect 27.

After output from interconnect 27, the MEMs mirrors corresponding to the receiving fibers tilt to couple the incident beam into a corresponding designated output fiber. It will be appreciated that the illustrated trajectories and configurations of reflective elements such as element 41 are exemplary only and the number and arrangement of trajectories is dependent on the switch layout and number and position of optical fiber banks.

Switch Layout and Coupling Optics

Returning to FIG. 1, central to the switch design of FIG. 1 is the consideration of size and compactness. To provide a compact switch design, various coupling optics are included. The various elements, including interconnect 27 and MEMs arrays 19, 21, 23 and 25 are mounted on a common substantially planar substrate 43 extending in the horizontal intra-array switching plane. In one exemplary embodiment, substrate 43 has outer dimensions of about 40×30×5 mm. In addition to supporting the optical elements, substrate 43 includes electrical interconnections for powering the MEMs mirrors and providing control signals between control system 29 and the MEMs mirrors.

Included in the coupling optics are a number of directing elements 45, 47, 49 and 51, coupling prisms 53, 55, 57 and 59, prisms 61, 63, 65 and 67, and optical power elements in the form of cylindrical lenses 69, 71, 73, 75, 77 and 79, as shown in FIGS. 1 and 2. The operation of the various coupling optics are described below.

Lenses 69 and 71 are cylindrical with curvature and optical power in the intra-array axis. Lenses 69 and 71 have like dimensions and properties and are disposed symmetrically about interconnect 27. The combination of lenses 69 and 71 operate as an angle-to-offset conversion unit in switch 1. In particular, lenses 69 and 71 together act as a compound Fourier lens to convert the input beam angle into a corresponding spatial offset in the intra-array axis. The input angle of an optical beam is controlled by the tilt angle of the corresponding input MEMs mirror and the corresponding spatial offset after propagation through both of lenses 69 and 71 directs the beam onto a predetermined MEMs mirror of an output fiber. In some embodiments, lenses 69 and 71 are configured to also direct the beams perpendicularly onto interface 27.

Lenses 73, 75, 77 and 79 are cylindrical having curvature and optical power in the array switching axis and act to collimate the input optical beams in the array switching axis through interconnect 27, as best shown in FIG. 2. Lens 73 is associated with beams propagating to and from fiber bank 3 and is located about one focal length from the MEMs mirrors of bank 3. Similarly, lens 75 is associated with beams propagating to and from fiber bank 5 and is located about one focal length from the MEMs mirrors of bank 5. Through interconnect 27, the optical beams are focused in the array switching axis and collimated in the intra-array switching axis.

In some embodiments, in addition to enabling angle to offset switching, lenses 69 and 71 also act to confine and even reshape the radius of beams to predefined parameters. In one embodiment, lenses 69 and 71 confine the optical beams to a radius of about 85 µm for propagation through interconnect 27. In other embodiments, lenses 69 and 71 are configured to confine the beams to other radii.

Lenses 69 and 71 each preferably have a focal length of about 29.2 mm. In switch 1, the lenses form a lens pair or compound lens system and the combined focal power of the lens system lenses pair in the intra-array switching axis provides an effective focal length of about 14.6 mm. This allows the path length between fiber banks and interconnect 27 to be about 15 mm and the total length of switch 1 (in the z dimension) is limited to about 40 mm. The width of switch 1 (in the y dimension) is less than that of the length (about 30 mm) as beam paths to fiber banks 7 and 9 are divided between the z and y dimensions by prisms 65 and 67.

Figure 3:
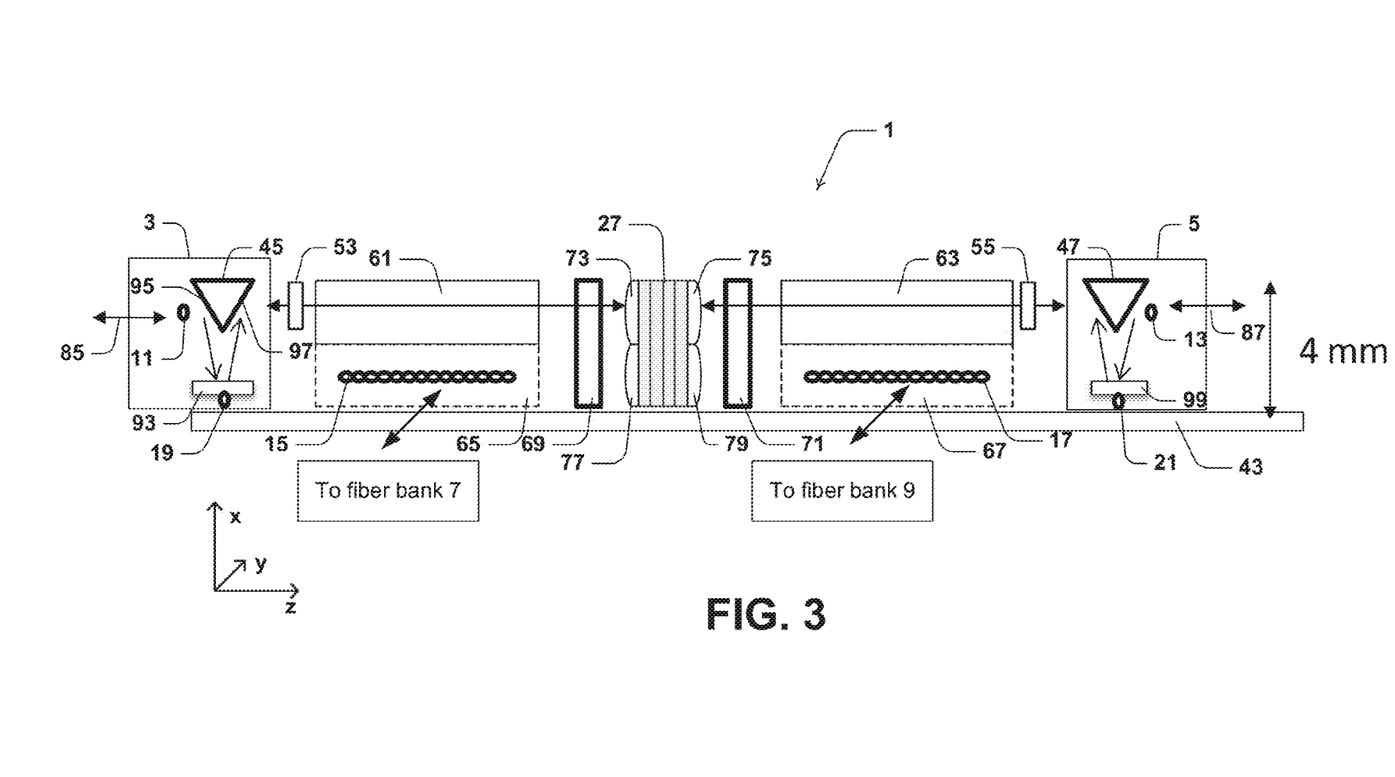
FIG. 3 illustrates a schematic cross section of the optical switch of FIG. 1 taken along line A-B of FIG. 1.

Lenses 73, 75, 77 and 79 each have an effective focal length of about 14.6 mm and act as symmetric pairs in that beams passed initially through one lens are initially collimated then focused by the second lens after emerging from interconnect 27 for propagation to an output fiber array. As shown in FIG. 3, lenses 73 and 75, and lenses 77 and 79 are located on vertically separated optical planes or tiers. This allows the fiber banks to be more closely spaced to provide a more compact switch design. The height (in the x dimension) of each optical plane is about 2 mm and the total height of switch 1 is about 5 mm.

It will be appreciated that, in other embodiments, switch 1 is able to be scaled up or down in size having larger or smaller physical dimensions. It will also be appreciated that, in other embodiments, switch 1 includes other optical power elements such as curved mirrors that perform equivalent functions to lenses 69, 71, 73, 75, 77 and 79.

Operation of the Device

Operation of switch 1 will now be described with reference to example switching paths 81 and 83 shown in FIG. 1. Switching path 81 switches an optical beam between example optical fibers 85 and 87. Switching path 83 switches an optical beam between example optical fibers 89 and 91. It will be appreciated that optical beams can be similarly directed through other paths to individually switch optical beams between other optical fibers connected to switch 1.

Following initially path 81, the optical beam emerges from fiber 85, passes through the corresponding connector port and micro-lens of array 11 and is incident onto the corresponding MEMs mirror 93 in array 19. Mirror 93 is preconfigured by a control signal to tilt at predetermined angles in the first and second dimension based on the position of the desired output fiber bank and output fiber within that bank. The control signals are sent from control system 29 that is electronically coupled to the switch and to each MEMs mirror through electrical interconnects in substrate 43. In response to a switching input request (and prior to the beam reaching the MSMs mirror), control system 29 accesses a lookup table corresponding to MEMs mirror 93, extracts the required tilt data and sends a control signal to mirror 93 to tilt the mirror in both the first and second dimensions to address the beam to the designated output fiber 87. Similar lookup tables for each other MEMs mirror in switch 1 are accessible to control system 29. In some embodiments, control system 29 is a local processor directly connected to switch 1. In other embodiments, control system 29 includes a local microcontroller connected to an external processor or computer by an Ethernet cable, USB cable, Wi-Fi or other communication medium and protocol. In these latter embodiments, the microcontroller is configured to execute control instructions received from the processor or computer.

Referring now to FIG. 3, MEMs mirrors are situated on substrate 43 and face vertically. Therefore, mention of the MEMS mirrors tilting in the array switching axis and intra-array switching axis refers to the resulting change in beam trajectory in the x-z and y-z planes respectively. To translate the horizontally propagating beams from optical fiber 85 vertically onto MEMs mirror 93, the beam is incident onto directing element 45, which is situated above mirror 93. Directing element 45 extends along the length of fiber bank 5 for enabling direction of beams to and from each optical fiber in the bank. Directing element is triangular in cross-section and includes first angled surface 95 for directing the beam downward onto mirror 93 and a second angled surface 97 for directing the beam that is reflected upward from mirror 93 in the horizontal dimension. Corresponding directing elements are included in each fiber bank of switch 1.

As best shown in FIG. 1, after emerging from fiber bank 3, the beam is transmitted through a glass coupling prism 53 which adjusts the trajectory of the beam in the intra-array switching dimension for coupling through the optical system. Coupling prism 53 also corrects the trajectory of beams returning to fiber bank 3 such that they return aligned with the corresponding output optical fiber. Corresponding coupling prisms 55, 57 and 59 are associated with the other fiber banks in switch 1.

The beam following path 81 next passes through prism 61, which is formed of a glass material. Prism 61 is included for the purpose of steering the beams correctly to fibers within bank 3 and matching the path length of various switching paths in switch 1. All beams directed to or from fiber bank 3 must pass through prism 61. Fiber banks 5, 7 and 9 each have corresponding prisms 63, 65 and 67, which perform similar functions to prism 61. However, as will be described below, prisms 65 and 67 also redirect the beams from off-axis fiber banks 7 and 9.

After traversing prism 61, the beam passes through lens 69, which is located at a distance of about half a focal length of lenses 69 and 71 (each with a focal length of $f_{lens\ 69} = f_{lens\ 71} \approx 29.2$ mm) from the MEMs mirrors in each fiber bank. More specifically, interconnect 27 is located about half a focal length of lenses 69 and 71 from the MEMs mirrors of each fiber bank and lenses 69 and 71 are located in close proximity to interconnect 27. The combined focal power of lenses 69 and lens 71 defines an effective focal length of about 14.6 mm, and the lenses act to convert the beam's angular trajectory in the intra-array switching axis (y-z plane in FIG. 1) to a spatial offset in that axis (angle to offset conversion). In the case where a beam trajectory is reflected back from interconnect 27, the beam passes through the same lens a second time providing the equivalent double-pass function as passing through both lenses. Therefore, the optical path is symmetric independent of the beam trajectory.

Figure 4:
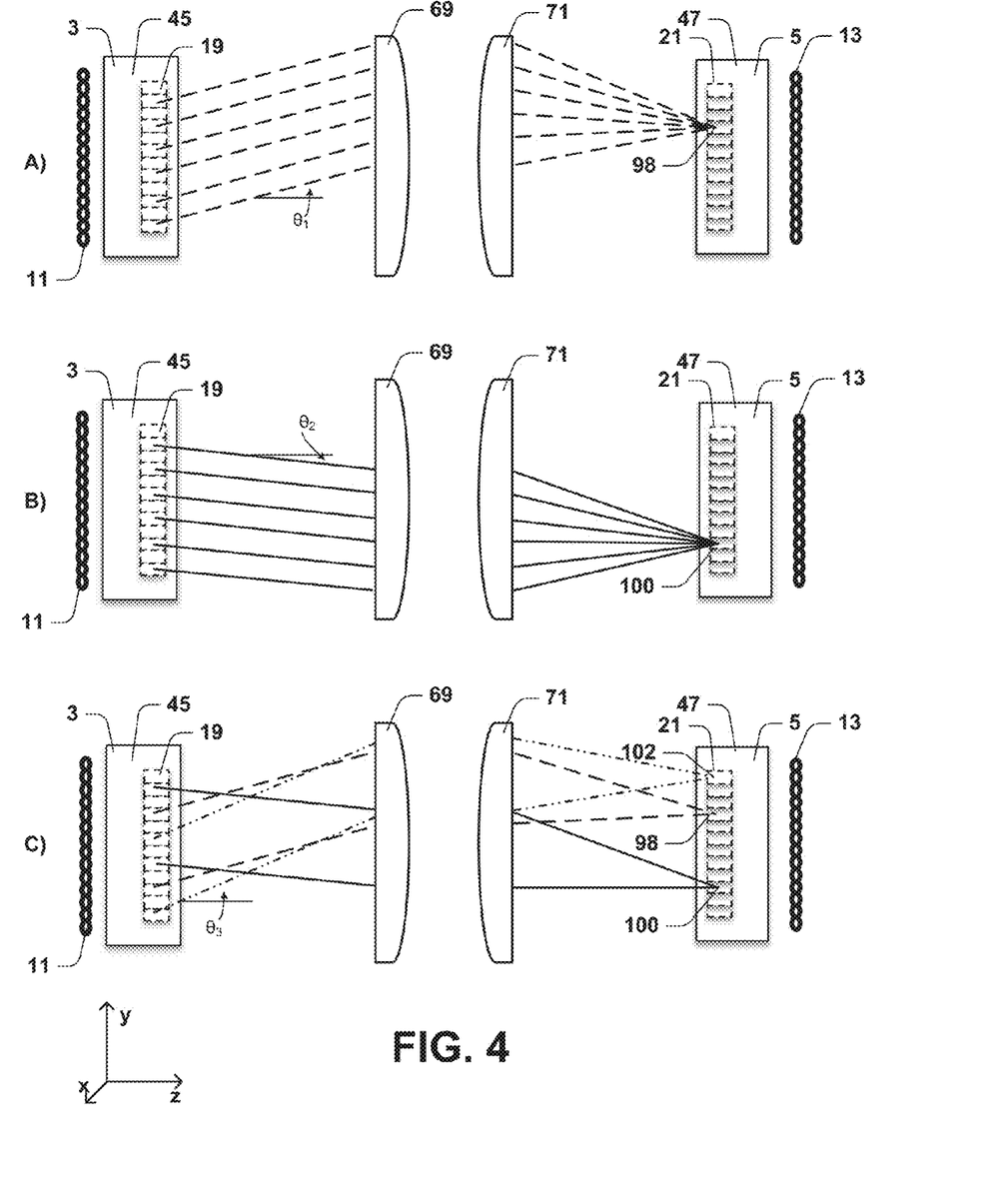
FIG. 4 illustrates three schematic side views of lenses and fiber banks of the switch of FIG. 1, together with example beam trajectories.

The operation of lenses 69 and 71 are central to the operation of switch 1 and are described with reference to FIG. 4, which schematically illustrates example trajectories between fiber banks 3 and 5. For simplicity, all optical elements of switch 1, with the exception of lenses 69 and 71 and those relating to fiber banks 3 and 5, are omitted in FIG. 4. It will be appreciated that equivalent functionality of lenses occurs between other fiber banks.

In essence, the tilt angles of the MEMs mirrors in the intra-array switching axis define the particular fiber within the designated array to which optical beams will be directed. Moreover, the tilt angle to address a specific output fiber is common for each MEMs mirror in an array, independent of the position of the input fiber in the array. This is illustrated in panels A) to C) of FIG. 4. In panel A), beams from six different input fibers in bank 3 are directed to a single output fiber 98 in bank 5. To do this, each MEMs mirror is set to a tilt angle of $\theta_1$, which is specific to fiber 98. Similarly, in panel B), beams from the same six input fibers in bank 3 are directed to a second output fiber 100 in bank 5. In this case, each MEMs mirror is set to a tilt angle of $\theta_2$, which is specific to fiber 100. Finally, in panel C), beams from the same six input fibers in bank 3 are directed to three different output fibers in bank 5; fibers 98, 100 and a third output fiber 102. Fiber 102 has an associated MEMs mirror tilt angle of $\theta_3$. In panel C), the trajectories defined by the three different switch angles are designated with different line patterns. As shown, the three switch angles $\theta_1$, $\theta_2$ and $\theta_3$ translate to three distinct output fibers.

At the respective output fibers, the output MEMs mirrors are configured to tilt at corresponding tilt angles to efficiently couple the beams perpendicularly into the associated output fiber. In the switching process, lenses 69 and 71, together with the MEMS mirrors, form the primary switching elements of switch 1. The electronic control of the tiltable MEMs mirrors imposes a switching angle onto the optical beams and the optical power of lenses 69 and 71 converts this switching angle to a spatial offset. It will be appreciated that this switching process is able to be performed even without interconnect 27 and embodiments of switch 1 exist where interconnect 27 is not required.

As shown in FIGS. 2 and 3, prior to incidence onto interconnect 27, the beam passes through a further lens 73. Lens 73 acts to collimate the beam in the array switching dimension (x-z plane in FIG. 1) for propagation through interconnect 27 with a small beam waist. As illustrated in FIG. 2, the beam directed to fiber bank 5 passes along a predetermined path through interconnect 27. In the illustrated embodiment, the path is direct. However, in other embodiments, the path may include one or more redirections from reflective elements (such as elements 41, 42, 44 or 46) within interconnect 27.

As the beam is originating from fiber bank 3, it strikes interconnect 27 in the upper region 37 of left face 33. The beam is directed to fiber bank 5 so it exits the interconnect in the upper region 37 of right face 35. As shown in FIG. 1, after exiting interconnect 27, the beam travelling along path 81 passes through lens 75 and lens 71, prism 63 and coupling prism 55 and directing element 47, which perform similar symmetric functions to the equivalent elements described above. The beam is received at a corresponding MEMs mirror 99, which is set at a predefined tilt angle by control system 29 such that the beam is directed into output fiber 87.

Operation of the switch along switching path 83 is largely similar to that described in relation to switching path 81. However, there are some differences which are described below.

Referring again to FIG. 1, to provide a compact switch design, fiber banks 7 and 9 are disposed perpendicularly to faces 33 and 35 of interconnect 27. Further, as shown in FIG. 3, fiber banks 7 and 9 are offset vertically from fiber banks 3 and 5 with prism 65 and 67 disposed directly below prisms 61 and 63 respectively. To ensure beams passing to or from fiber banks 7 and 9 are directed correctly through interconnect 27, prisms 65 and 67 include respective directing surfaces 101 and 103. Surfaces 101 and 103 are each angled at 45° to the respective fiber bank and interconnect 27 and include a reflective coating for directing beams emerging from fiber banks 7 and 9 respectively onto interconnect 27, and similarly for directing beams from interconnect 27 to fiber banks 7 and 9.

In other embodiments, fiber banks 7 and 9 are situated beneath fiber banks 3 and 5 along the z axis. In these embodiments, directing surfaces 101 and 103 are angled at 45° in the x-z plane to direct beams vertically along the z-axis.

As shown in FIG. 2, beams propagating to or from lower fiber banks 7 or 9 are directed through the lower region 39 of interconnect 27. Therefore, a beam propagating along path 83 enters interconnect at the lower region 39 of right face 35 and exits at the lower region 39 of left face 33. The other optical elements in switching path 83 operate as described in relation to path 81 above.

It will therefore be appreciated that corresponding switching paths are possible between any two fibers connected to any fiber bank in switch 1.

120×120 Fiber Embodiment

Figure 5:
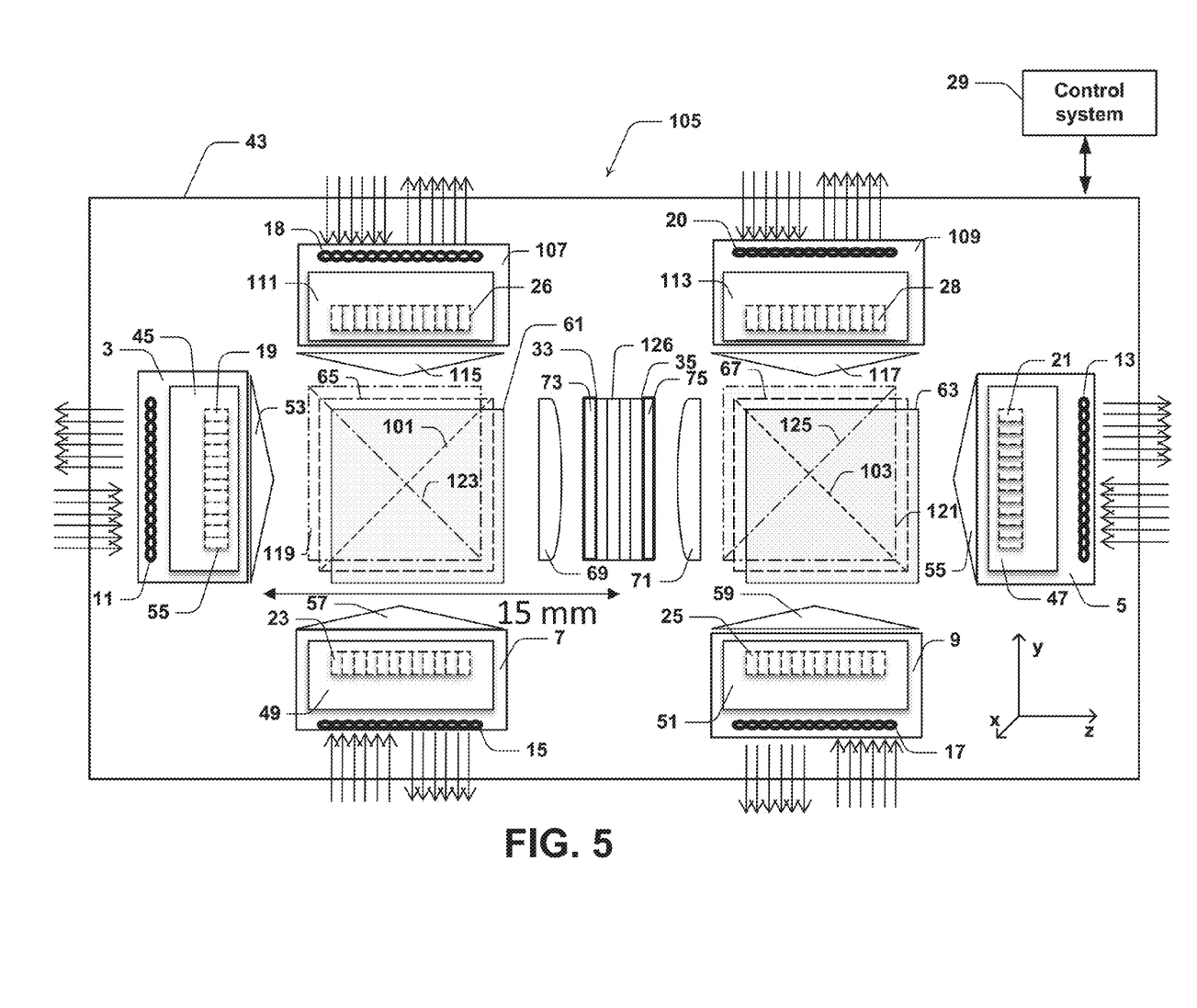
FIG. 5 illustrates a schematic plan view of an optical switch according to a second embodiment having capability of switching optical beams between one hundred and twenty optical fibers.

It will be appreciated that the configuration of switch 1 is able to be upscaled or downscaled to include capability to switch between more or less optical fibers. Referring now to FIG. 5, there is illustrated a second embodiment of an optical switch 105 having capability of switching optical beams between one hundred and twenty optical fibers. Corresponding features of switch 1 are designated the same reference numerals in FIG. 5. The additional fiber switching capability of switch 105 over switch 1 is provided in two additional fiber banks 107 and 109, each of which includes capability of connecting twenty optical fibers. To address the two additional fiber banks 107 and 109, each MEMs mirror is electrically controllable to tilt at six angles in the array switching dimension; one angle for each of the six fiber banks present in switch 105. Fiber banks 107 and 109 include respective connector port arrays 18 and 20, and MEMs mirror arrays 26 and 28.

Fiber banks 107 and 109 are situated in a third horizontal plane or tier of switch 105 that is disposed vertically below fiber banks 7 and 9. Directing elements 111 and 113, coupling prisms 115 and 117, and prisms 119 and 121 are also disposed on the lower layer with fiber banks 107 and 109. Like prisms 65 and 67, prisms 119 and 121 include respective reflective directing surfaces 123 and 125 for directing optical beams between fiber banks 107 and 109 and interconnect 27. Surfaces 123 and 125 are disposed at 45° to the z axis, and are perpendicular to surfaces 101 and 103.

Figure 6:
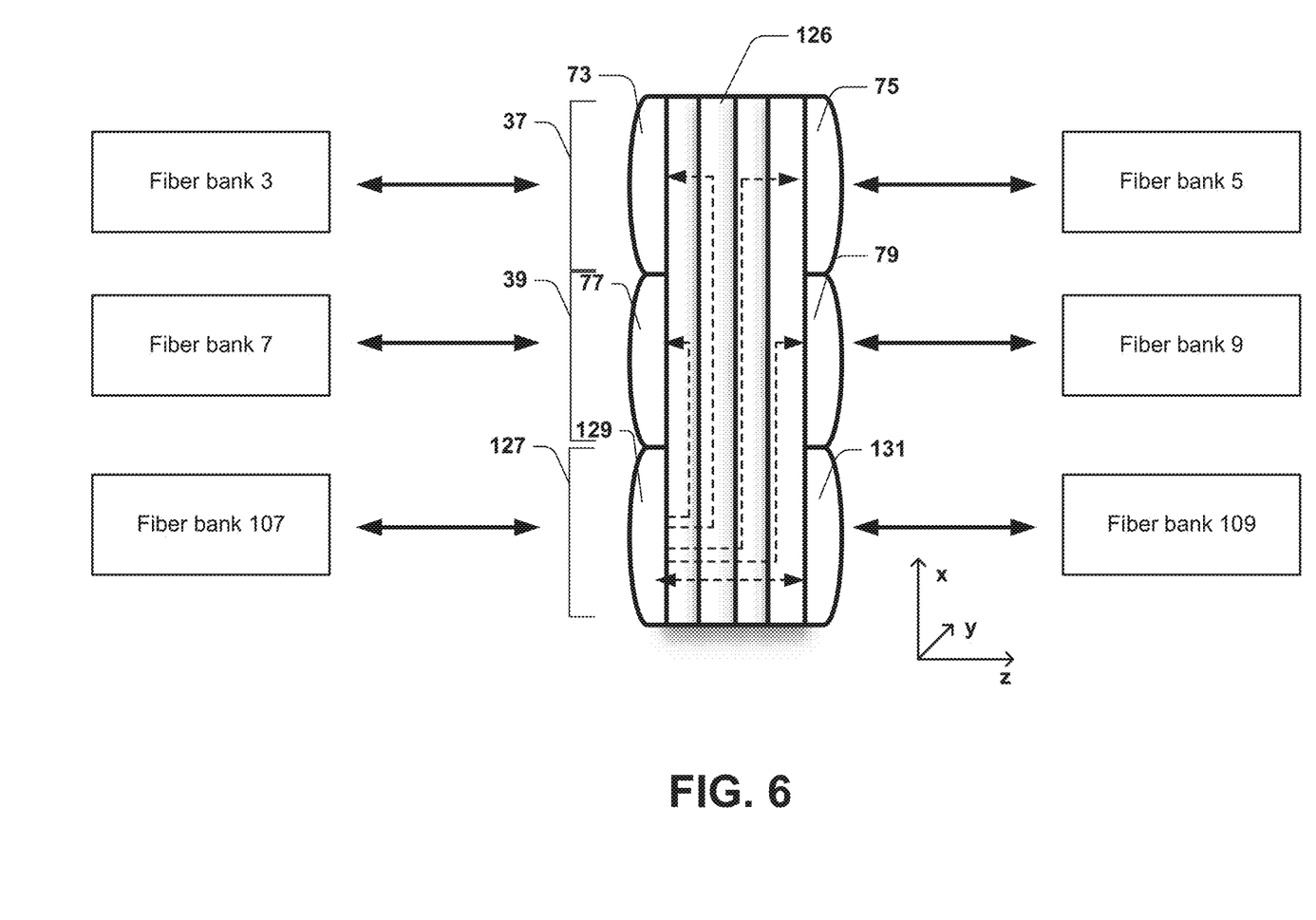
FIG. 6 illustrates a side view of an optical interconnect for use in the switch of FIG. 5.

Referring now to FIG. 6, there is illustrated a side view of an interconnect 126 for use in switch 105. Interconnect 126 includes three vertically separated regions: regions 37 and 39 as in interconnect 27 of switch 1; and lower region 127, which is located on the third horizontal plane with fiber banks 107 and 109. As with regions 37 and 39, region 127 has a pair of corresponding cylindrical lenses 129 and 131 on either side of the region. As shown, each region is responsible for directing optical beams to or from different fiber banks. As with interconnect 27 of FIG. 2, regions 37 and 39 direct beams to fiber banks 3, 5, 7 and 9. Region 127 directs beams to and from fiber banks 107 and 109. Example beam paths from fiber bank 107 to each of the other fiber banks are shown in FIG. 6.

The dimensions of switch 105 are slightly larger than those of switch 1. In particular, switch 105 has a greater width and height thickness than switch 1 due to the addition of fiber banks 107 and 109, which are located on a third horizontal plane. Further, interconnect 27 includes more layers to account for the additional switching paths. This adds to the length of interconnect 27 and also to the total length of switch 105. Even with these increased spatial requirements, in some embodiments, switch 105 is able to be constructed with total dimensions (length, width, height) of about 50 mm by 40 mm by 8 mm.

Considering the symmetric design of switches 1 and 105, which are transmission mode switches, it will be appreciated that equivalent reflective mode switches are able to be constructed. Some reflective mode embodiments are constructed by replacing the transmissive interconnect with a reflective interconnect. Other reflective mode embodiments are constructed by replacing the angle-to-offset converting lenses 69 and 71 with an equivalent curved reflective mirror.

Wavelength Selective Switch Application

While described in relation to an optical cross-connect, it will be appreciated that the switches described above are also applicable to wavelength selective switch (WSS) type devices with some modifications. In some WSS type embodiments, each fiber bank in the switch includes a dispersive element for spatially dispersing wavelength channels from the input optical beams. In some WSS embodiments, more than one MEMs mirror is allocated to each optical fiber for simultaneously and independently routing a number of dispersed wavelength channels from a single fiber through the switch.

CONCLUSIONS

It will be appreciated that the disclosure above provides an improved optical cross-connect type switch that is compact in size and suitable for use in datacenters. The compact optical cross-connect switch is able to be used for routing within a datacenter, providing high bandwidth advantages associated with all-optical switching. In one embodiment providing switching between one hundred and twenty optical fibers, the switch has dimensions of about 30 mm by 15 mm by 4 mm.

The optical cross-connect of the present disclosure provides advantages in size, cost and stability over known devices presently available. In particular, the switch design allows use of conventional elements such as fiber v-groove arrays and micro-lens arrays on pitches consistent with ribbon fibers (250 micron) and MEMs mirrors commonly available and employed in WSS devices. At the same time, the switch layout substantially reduces the switch angle requirements between arrays and fibers. In addition, the optical path includes lenses which define mode profiles that maximize the efficiency of the switching.

The combination of MEMs mirror switching with the symmetric angle-to-offset conversion unit (lenses 69 and 71) provides for flexible efficient switching of optical beams between a large number of optical fiber ports. With this arrangement of functional elements, a wide variety of other compact designs of switch can be realized with different fiber counts and configurations. In particular, fiber banks are able to be disposed about the angle-to-offset conversion unit at various positions in the x, y and z axes and coupled through the unit with relatively simple coupling optics and MEMs mirrors. In simple designs, the optical interconnect can be omitted and switching only occurs in one axis.

Interpretation

Throughout this specification, use of the term "element" is intended to mean either a single unitary component or a collection of components that combine to perform a specific function or purpose.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. An optical cross-connect connecting a series of optical input ports to a series of optical output ports, the cross-connect including:
    at least a first group of input/output port arrays located at spatially separated locations in at least a first horizontal dimension;
    each of the input/output port arrays having a series of optical input/output ports disposed horizontally and configured to project or receive optical signals;
    a plurality of steering elements configured to selectively steer optical signals along switching trajectories between the input and output ports by tilting vertically at predetermined inter-array angles to select a desired input/output port array and by tilting horizontally at predetermined intra-array angles to select a desired input/output port within the desired input/output port array;
    an angle-to-offset conversion unit for converting optical signals propagating at the horizontal intra-array angles to corresponding spatial offset signals in the horizontal dimension; and
    an optical interconnect having a series of input/output regions, each of the input/output regions being specific to a corresponding input/output port array and the input/output regions being divided vertically into elongated switching rows, each input/output region receiving spatial offset signals from the angle-to-offset conversion unit and optically interconnecting each spatial offset signal from a first input/output region to a second input/output region with predetermined interconnects interconnecting the input/output regions based on the inter-array angles of the spatial offset signals.

2. An optical cross-connect according to claim 1 wherein the angle-to-offset conversion unit includes a pair of cylindrical lenses having optical power in the first dimension and being disposed symmetrically about the optical interconnect.

3. An optical cross-connect according to claim 2 wherein the pair of cylindrical lenses define a compound lens system.

4. An optical cross-connect according to claim 3 wherein the compound lens system has a focal length off and the interconnect is disposed a distance of substantially f/2 from the plurality of steering elements.

5. An optical cross-connect according to claim 2 including a pair of collimating lenses disposed about the switching matrix unit and having optical power in the second dimension for collimating the optical signals onto the optical interconnect.

6. An optical cross-connect according to claim 5 wherein the pair of collimating lenses are separate to the cylindrical lenses.

7. An optical cross-connect according to claim 1 wherein the plurality of steering elements include micro-electromechanical mirrors (MEMs) configured to be electromechanically tiltable in two dimensions.

8. An optical cross-connect according to claim 7 wherein the number of inter-array angles corresponds to the number of input/output port arrays in the cross-connect.

9. An optical cross-connect according to claim 1 wherein the number of intra-array angles corresponds to the number of optical input/output ports within each input/output port array.

10. An optical cross-connect according to claim 1 wherein a first subset of the input/output port arrays are disposed along a first horizontal plane and a second subset of the input/output port arrays are disposed along a second horizontal plane vertically separated from the first horizontal plane.

11. An optical cross-connect according to claim 1 wherein at least a subset of the input/output port arrays are disposed at angles with respect to each other.

12. An optical cross-connect according to claim 11 wherein the first group of input/output port arrays are disposed along a primary axis and the second group of input/output port arrays are disposed along a secondary axis at an angle relative to the primary axis.

13. An optical cross-connect according to claim 12 including at least one optical coupling device for directing optical signals between the primary axis and the secondary axis.

14. An optical cross-connect according to claim 13 wherein the at least one coupling device includes a reflective mirror.

* * * * *